(12) United States Patent
Pettigrew et al.

(10) Patent No.: US 7,797,443 B1
(45) Date of Patent: ***Sep. 14, 2010

(54) SYSTEM AND METHOD FOR DETECTING SPAM E-MAIL

(75) Inventors: Nancy Pettigrew, Venice, CA (US); Amit Jhawar, Los Angeles, CA (US)

(73) Assignee: Microsoft Corporation, Redmond, WA (US)

( * ) Notice: Subject to any disclaimer, the term of this patent is extended or adjusted under 35 U.S.C. 154(b) by 730 days.

This patent is subject to a terminal disclaimer.

(21) Appl. No.: 10/728,023

(22) Filed: Dec. 3, 2003

(51) Int. Cl.
*G06F 15/16* (2006.01)
(52) U.S. Cl. .................. 709/232; 709/207; 709/223; 709/230; 709/206; 709/236; 713/153; 726/13
(58) Field of Classification Search .......... 709/206, 709/223, 236, 232, 230; 713/153; 726/13
See application file for complete search history.

(56) References Cited

U.S. PATENT DOCUMENTS

| 6,725,378 | B1 * | 4/2004 | Schuba et al. .......... 726/13 |
| 7,117,358 | B2 * | 10/2006 | Bandini et al. .......... 713/153 |
| 7,275,093 | B1 * | 9/2007 | Freed et al. .......... 709/223 |
| 7,346,700 | B2 * | 3/2008 | Gould et al. .......... 709/232 |
| 7,403,999 | B2 * | 7/2008 | Corl et al. .......... 709/230 |
| 2002/0116641 | A1 * | 8/2002 | Mastrianni .......... 713/201 |
| 2003/0109248 | A1 * | 6/2003 | Lewis .......... 455/412 |
| 2005/0015455 | A1 * | 1/2005 | Liu .......... 709/207 |

* cited by examiner

*Primary Examiner*—David Wiley
*Assistant Examiner*—Kyung H Shin (57) ABSTRACT

An improved system and method for detecting spam e-mail over a distributed network is disclosed. The distributed network includes multiple servers that receive and process e-mail messages for a multiple remotely located clients. The system includes multiple packet sniffers that are each located on a unique one of servers. The packet sniffers extract originating IP addresses associated with e-mail messages that are communicated to the clients over the network. The system further includes a central monitor that communicates with the packet sniffers and that monitors data regarding originating IP addresses. The monitor determines whether an originating IP address has exceeded a threshold value and may take corrective measures in response, such as generating an alert to a spam analyst or blocking messages originating from that IP address. By leveraging data from several different clients, the system can detect and stop spam messages for an IP address even if a spammer has not targeted a specific customer.

35 Claims, 4 Drawing Sheets

SYSTEM AND METHOD FOR DETECTING SPAM E-MAIL

FIELD OF THE INVENTION

The present invention generally relates to a system and method for detecting spam e-mail and more particularly, to a system and method that determines the existence of spam e-mail messages directed to different clients across a distributed network, in order to quickly and effectively detect distributed spam "attacks", and to take corrective measures in response to such a detection.

BACKGROUND OF THE INVENTION

Unsolicited mass e-mail or "spam" has become a serious problem for all Internet users. A user can receive tens of hundreds of spam messages in a given day. Some companies specialize in creating distribution lists that allow senders of spam or "spammers" to easily reach millions of undesiring recipients with advertisements and solicitations.

In view of the increasing burden created by spam, efforts have been made to filter spam before it reaches its intended recipients. Some conventional spam filters block or filter messages originating from a particular source address that has been previously associated with a spammer. One drawback with these types of conventional filters is that they are often too slow to effectively react to distributed spam "attacks" (i.e., bursts of many spam messages transmitted to a large number of recipients in a relatively short period of time). Spammers often change the addresses from where they transmit spam messages, and once a filter determines that an address is originating spam, it may have already transmitted thousands of messages that were received by undesiring recipients. Also, many of these conventional filters will block messages based on originating address only after a particular customer or client receives more than a predetermined number of spam messages. As a result, these conventional filters are ineffective to inhibit spammers who issue mass spam mailings to many different recipients, if each recipient receives only a limited number of mailings.

The present invention provides an improved system and method for analyzing spam e-mails using a distributed network that promptly detects a spam attack based on an originating IP address. The system and method monitor e-mail messages received by different clients across the distributed network, determine when the number of messages from an IP address communicated to multiple clients has exceeded an acceptable threshold, and take corrective measures in response to such a determination, such as generating an alert to a spam analyst or automatically blocking future e-mail messages from the IP address.

SUMMARY OF THE INVENTION

The present invention provides an improved system and method for detecting spam e-mail using a distributed network. In one aspect, the invention leverages the e-mail traffic resulting from a diverse customer base to identify IP addresses that are sending spam. The invention detects the originating IP address of e-mails received over the network, and monitors the number and/or frequency of connections or e-mails from those IP addresses for the entire customer base. If the number and/or frequency of connections or e-mails from a particular IP address exceed a predetermined threshold, the system may take corrective measures, such as generating an alert to a spam analyst or blocking messages originating from that IP address. This allows the system to detect and stop spam messages for an IP address even if a spammer has not targeted a specific customer. For example, fifteen unrelated customers might each receive spam messages from the same IP address, but not enough spam messages individually to trigger a block against the IP address. However, the present invention will monitor the total spam message volume and/or frequency for the fifteen customers combined, and determine that it is sufficient to warrant blocking the IP address for the entire customer base.

One advantage of the invention is that it provides a system and method that leverages a diverse customer base to detect spam attacks across a network.

Another advantage of the invention is that provides a system and method for detecting spam that can rapidly and effectively respond to a spam attack over a distributed network.

Another advantage of the invention is that it provides a system and method for detecting spam directed to a plurality of different remotely located and unrelated customers or clients, which allows spam to be quickly and effectively detected even if a spammer has not repeatedly targeted a specific customer.

According to one aspect of the present invention, a system for processing e-mail is provided. The system includes a distributed network including a plurality of servers that receive e-mail messages for a plurality of different remotely located clients, each of the servers having a packet sniffer that extracts originating IP addresses associated with e-mail messages that are communicated to the clients over the network. The system further includes a monitor that communicates with the packet sniffers and that monitors data regarding the originating IP addresses, determines whether traffic from an originating IP address has exceeded a threshold value, and generates a response for use in detecting spam e-mail messages if the threshold value has been exceeded.

According to another aspect of the present invention, a system is provided for detecting spam e-mail messages in a distributed network. The distributed network includes a plurality of servers that receive and process e-mail messages for a plurality of different remotely located clients. The system includes a plurality of packet sniffers, each of which is located on a unique one of the plurality of servers and extracts originating IP addresses associated with e-mail messages that are communicated to clients by the server; and a monitor that communicates with the packet sniffers and that monitors data regarding originating IP addresses, determines whether traffic from an originating IP address has exceeded a threshold value, and generates a response for use in detecting spam e-mail messages if the threshold value has been exceeded.

According to another aspect of the present invention, a method is provided for processing e-mail and detecting spam e-mail messages. The method includes routing the e-mail messages through a distributed network including a plurality of servers that receive and process e-mail messages for a plurality of different remotely located clients; communicating the processed messages to the plurality of remotely located clients by use of the plurality of servers; extracting originating IP addresses associated with e-mail messages that are communicated to the plurality of remotely located clients; monitoring data regarding originating IP addresses; determining whether traffic from an originating IP address has exceeded a threshold value; and generating a response for use in detecting spam e-mail messages if the threshold value has been exceeded.

These and other features and advantages of the invention will become apparent by reference to the following specification and by reference to the following drawings.

DETAILED DESCRIPTION OF THE EMBODIMENTS

The present invention will now be described in detail with reference to the drawings, which are provided as illustrative examples of the invention so as to enable those skilled in the art to practice the invention. Notably, the implementation of certain elements of the present invention can be accomplished using software, hardware, firmware or any combination thereof, as would be apparent to those of ordinary skill in the art, and the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Preferred embodiments of the present invention are illustrated in the Figures, like numerals being used to refer to like and corresponding parts of various drawings.

Figure 1:
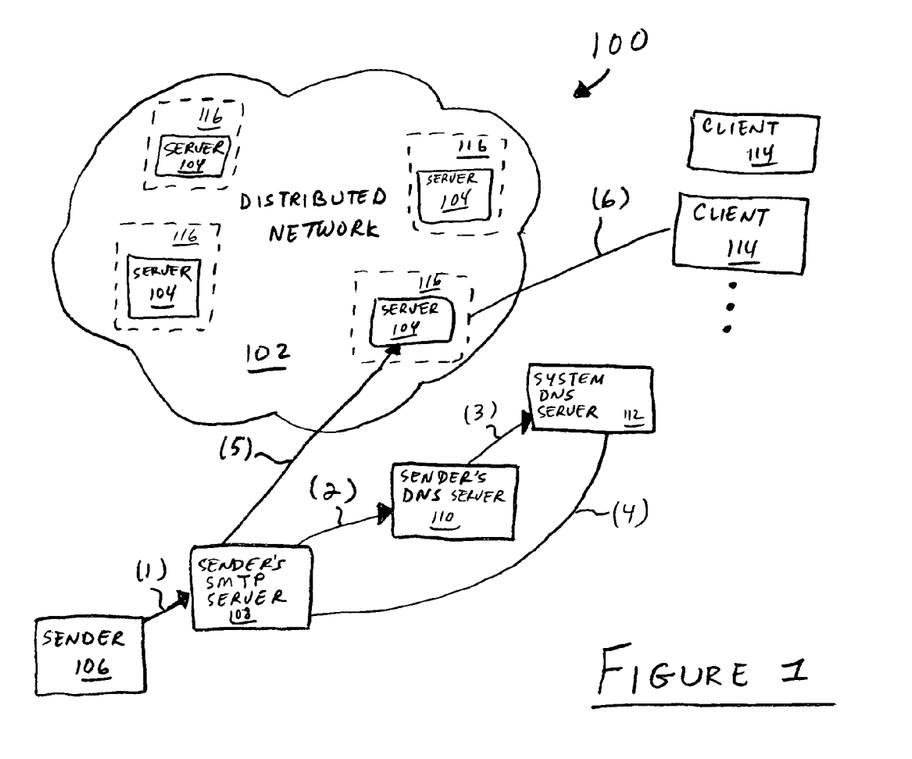
FIG. 1 is a schematic diagram illustrating a distributed system for managing e-mail, which may incorporate a system for detecting spam e-mail according to the present invention.

The present invention provides a system and method for detecting spam e-mail using a distributed network. The term "spam" can be understood to include one or more unsolicited electronic messages, sent or posted as part of a larger collection of messages, all having substantially identical content. FIG. 1 illustrates one embodiment of a system 100 for managing e-mail, which may incorporate a system for detecting spam e-mail, according to the present invention. FIG. 1 illustrates how e-mail traffic passes through system 100, which may be effective to screen, filter and disinfect e-mail prior to delivering it to its intended recipients. Although the present discussion concerns the spam detecting and filtering capabilities of system 100, it should be appreciated that system 100 may also function to filter content, detect and clean viruses and perform other desired e-mail screening functions. System 100 is preferably implemented over a distributed network 102 having multiple conventional servers 104, which are communicatively interconnected. The system 100 preferably includes several remote and secure data centers 116 that each house one or more servers 104. The data centers 116 are physically constructed to withstand substantial meteorological and geological events, and include state of the art security measures, climate control systems, built-in redundancies and back-up generators to ensure high availability and reliability. The data centers 116 are preferably dispersed in remote locations throughout a geographic coverage region. A system operator may control operation of the system 100, and signup multiple remotely located customers or "clients" 114 that may be recipients of e-mail. The clients 114 may be remotely located from each other and unrelated. Each different customer or client 114 may represent a single machine or an entire enterprise, including multiple servers. Any e-mail directed to clients 114 will pass through system 100. As will be described in more detail shortly, system 100 will analyze the e-mail traffic and substantially eliminate or reduce spam before it reaches clients 114. In order to route all e-mail through system 100, each client 114 changes its mail exchanger or "MX" record to reflect the IP address of a conventional DNS server 112 for the system. In this manner, all mail directed to the clients 114 will reach the DNS server 112 for system 100 and be passed through the system 100 prior to reaching clients 114. This process is best shown by a description of steps (1)-(6) depicted in FIG. 1.

When a sender 106 transmits an e-mail message addressed to a client 114, the e-mail passes through system 100 as follows. In step (1), the message passes to a conventional Simple Mail Transfer Protocol (SMTP) server 108 for the sender. In step (2), the SMTP server 108 communicates with a conventional DNS server 110 for the client 106 to request the MX record for the client 114. In step (3), the sender's DNS server 110 makes a record request for the client's MX record, which is now associated with the system's DNS server 112. This request is thus passed to the system's DNS server 112. The system's DNS server 112 then selects the most appropriate data center 116 to service the e-mail. The system's DNS server 112 will select the most appropriate data center 116 based on one or more of the following criteria: (i) the "health" of the servers 104 within the data center 116 (e.g., whether the servers are functioning properly); (ii) the capacity of the servers 104 within the data center 116 (e.g., whether the servers 104 are operating above or below a threshold capacity); (iii) the projected roundtrip time between a remote data center and the intended client 104; and (iv) the geographical distance between the sender 106 and/or the senders DNS server 110 and the data center 116. Different weights can be assigned to the different criteria based on what would be suitable or desirable to a system operator under a given set of circumstances.

In step (4), the system's DNS server 112 responds to the sender's SMTP server 108 with an IP address corresponding to a server 104 in the selected data center 116. In step (5), the SMTP server 108 delivers the message to server 104. Server 104 may include a storage location containing a "blacklist" of IP addresses, which represent IP addresses that have been determined to be generating spam. The server will cross-check the originating IP addresses of incoming connections to the addresses contained in the black list, and reject any message originating from an address on the blacklist. Server 104 may also include and pass the message through a message processor or "switch", i.e., a software program for analyzing and managing spam. A message switch is preferably located within each server 104. In one embodiment, the message switch may be of the type disclosed in co-pending U.S. patent application Ser. No. 10/690,422 of Pettigrew et al. (the '422 application), which is assigned to the present assignee, and which is incorporated herein by reference. The message switch compares e-mail messages to rules contained in a spam database (described below), in order to determine if a message is spam. If the message switch determines that a message is spam it may block or filter the message. Assuming the message switch does not block the message, server 104 subsequently transmits the message to client 114, as shown in step (6). The operation of the message switch is discussed in greater detail below in reference to FIG. 4.

Client mail servers are also preferably configured to direct outgoing traffic through the system 100. The IP addresses of client servers are defined on every mail server 104, allowing messages to relay through the network 102.

Figure 2:
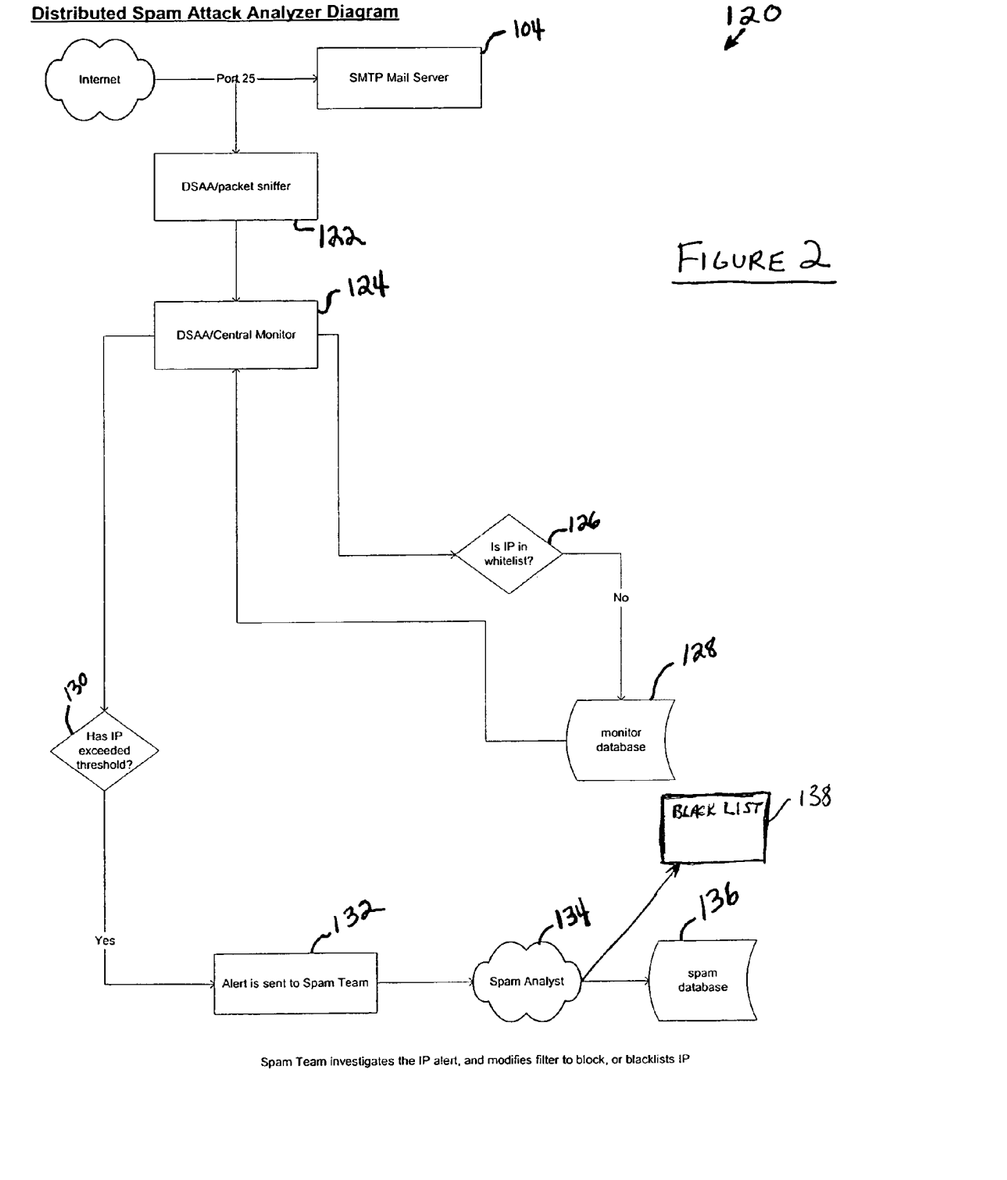
FIG. 2 is a block diagram illustrating a system for detecting spam e-mail according to the present invention, which may be employed in the system shown in FIG. 1.

FIG. 2 is a block diagram illustrating the operation of a system 120 for detecting spam e-mail, according to the present invention. While FIG. 2 will be primarily described in relation to a system and system components, it should be appreciated that each of the portions or blocks illustrated in FIG. 2 (as well as the portions or blocks illustrated in the other Figures) may represent logic steps or processes and/or the hardware and/or software utilized to perform the logic steps or processes. It should further be appreciated that the processes of any one or more of the portions or blocks shown can be implemented in a computer readable medium for controlling the operation of a computer.

In the preferred embodiment, the system 120 includes packet inspectors or "sniffers" 122 and a central monitor 124. Preferably, a packet sniffer runs on each mail server 104 across the distributed network 102, and the central monitor 124 runs on one or more centralized servers, and which are communicatively coupled to the mail servers 104. The packet sniffers 122 gather network wide statistics for IP connections. Specifically, the sniffers 122 obtain the originating IP address for each e-mail "connection" or message transmitted to a client across the distributed network 102. As discussed herein, a single "connection" may include one or a plurality of different messages addressed to a client's mail server. A packet inspector 122 will review each connection or message arriving at its corresponding server 104 from the Internet via port 25 to determine the originating IP address. More particularly, the packet inspector 122 may examine the first packet of each unit of data arriving at port 25, and extract the IP address from where the packet originated.

Figure 3:
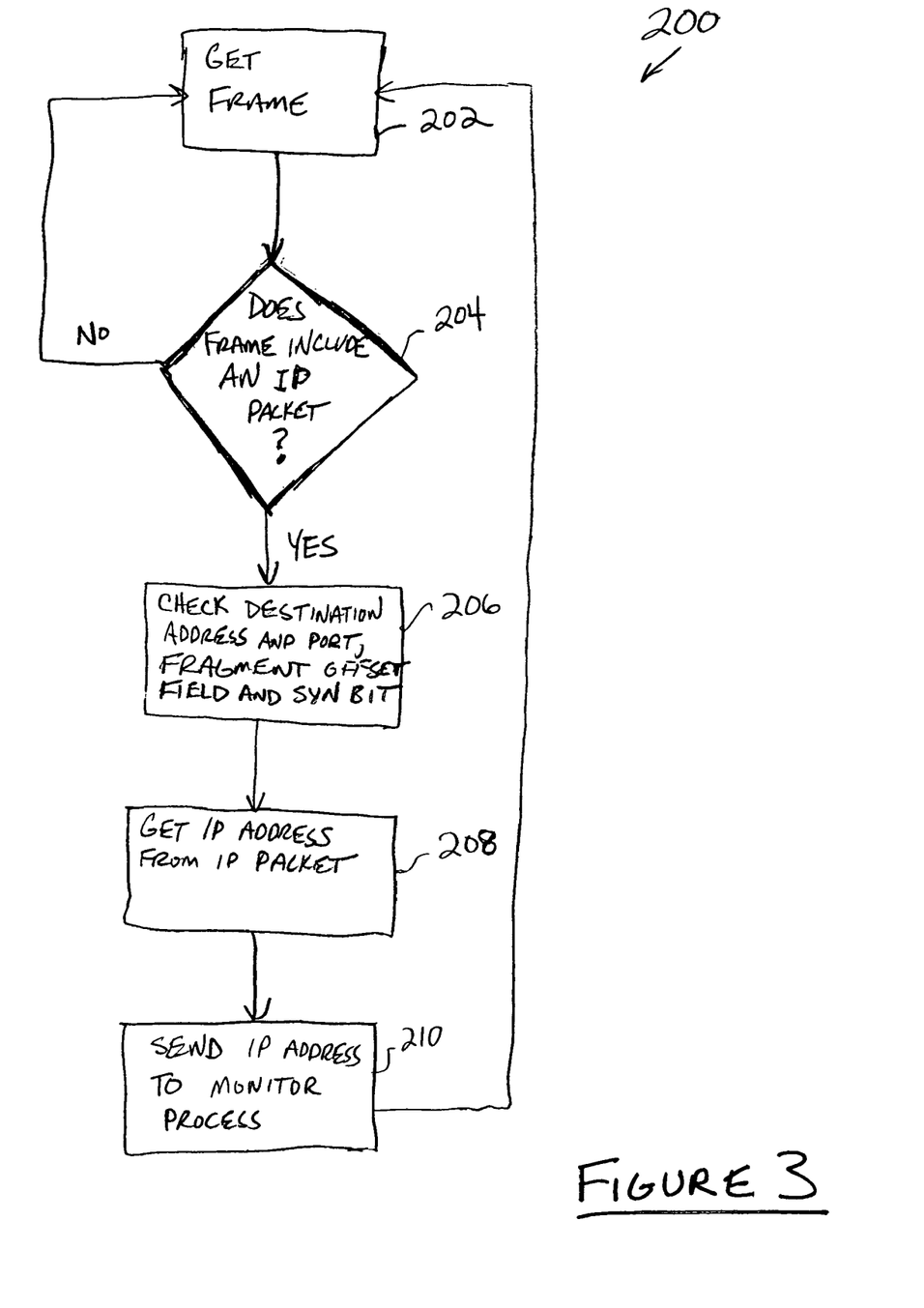
FIG. 3 is a flow diagram illustrating one example of a method used by a packet sniffer of the present invention to extract the originating IP address of e-mails received by the system.

In one embodiment, the packet sniffer 122 may extract IP addresses using the method 200 shown in FIG. 3. In step 202, the mail server 104 receives a unit of data transport or "frame" via port 25. In step 204, the packet sniffer 122 analyzes the frame to determine if it includes a packet having an IP address. If the frame does not include an IP address, the packet sniffer 122 returns to step 202 and reviews the next frame. Otherwise, the packet sniffer 122 proceeds to step 206. In step 206, the packet sniffer 122 checks the destination IP address of the packet to confirm that the IP address corresponds to the server 104 on which the packet sniffer 122 is running. If the IP address does not correspond to the server 104, the packet sniffer 122 may disregard the packet. The packet sniffer may also check the destination port of the IP packet to confirm that it corresponds to the configured port number. If the IP address does not correspond to the configured port number, the packet sniffer 122 may disregard the packet. In step 206, the packet sniffer 122 may also check the fragment offset field of the IP header to ensure it is the first fragment of a packet, if the packet is fragmented. If it is not the first fragment of a packet, the packet sniffer 122 may disregard the fragment. The SYN bit in the TCP header indicates if a new connection has been initiated; if the SYN bit is not set, the packet is disregarded. In step 208, the packet sniffer 122 extracts the originating IP address from the IP packet. Finally, in step 210, the sniffer communicates the IP address to the monitor 124 (e.g., via port 9999).

Referring back to FIG. 2, the central monitor 124 receives IP addresses from packet sniffer 122. The central monitor 124 is preferably a load-balanced central monitoring process that stores and monitors data regarding originating IP addresses in a database 128. The central monitor 124 maintains a list of acceptable IP addresses (e.g., a "white list"). The white list contains originating IP addresses that the system deems to be acceptable (i.e., are not spam) regardless of the number of times they connect to the distributed network. The white list may include IP addresses that the system operator and/or clients 114 know or report to be from legitimate sources. The central monitor 124 preferably checks all received IP addresses against the white list, as shown by block 126. If an IP address is not contained in the white list, the monitor 124 enters the address into database 128 if it is not already present within the database 128. If the IP address is already present in the database 128, the monitor 124 updates information associated with that address, such as the number of times the address has connected to the network, and the time of the last connection. The central monitor 124 uses this information to determine whether traffic (e.g., the number and/or rate of connections) from an IP address has exceeded a threshold value of connections, as shown in block 130.

The central monitor 124 may use several parameters, such as rate and maximum total connections parameters, to determine whether an IP address should be identified as originating spam (e.g., whether a spam alert should be generated). In one embodiment, the central monitor 124 may use a "token bucket" algorithm. The central monitor 124 may compute this algorithm each time it stores information regarding an IP address in the monitor database 128. The token bucket algorithm may be described using two parameters, a predetermined rate parameter "RT" (i.e., a number of connections "R" per time interval "T"), and a bucket depth or maximum total connections allowed parameter "B" (i.e., at any one time, if the system detects more than RT+b, where b<=B, connections or instances of any IP address, it may identify messages from the IP address to be spam). Using the token bucket algorithm, at any one time, the system will allow at most B connections for an IP address before identifying the IP address as originating spam. But over an extended period of time, the system will allow just R connections per T seconds. The table below provides one example illustrating the operation of the token bucket algorithm where the rate parameter "RT" is equal to 10 connections (R) every 10 seconds (T), and the burst parameter (B) is equal to 100.

| Time (T) | Number of connections (new) | Connections to add (R) | Connections left (new) = connections left (old) − number of connections (new) + connections to add (R) | Spam Alert |
|---|---|---|---|---|
| 0 | 0 | 0 | 100 (i.e., B − 0 − 0) | No |
| 10 | 5 | 10 | 100 (100 − 5 + 10, note the total connections cannot exceed B) | No |
| 20 | 50 | 10 | 60 (100 − 50 + 10) | No |
| 30 | 80 | 10 | 0 (60 − 80 + 10, note the number of | Yes |

-continued

| Time (T) | Number of connections (new) | Connections to add (R) | Connections left (new) = connections left (old) − number of connections (new) + connections to add (R) | Spam Alert |
|---|---|---|---|---|
| 40 | 30 | 10 | connections left cannot be less then 0) 0 (0 − 30 + 10, note the number of connections left cannot be then 0) | Yes |
| 50 | 0 | 10 | 10 (0 − 0 + 10) | No |
| 60 | 5 | 10 | 15 (10 − 5 + 10) | No |
| 70 | 10 | 10 | 15 (15 − 10 + 10) | No |

As shown by the table above, if the number of instances of an IP address for a particular period of time exceeds the threshold value (e.g., connections left−connections to add) for that period of time, the monitor 124 determines that the IP address may present a spam threat. As shown in block 130, if the monitor 124 detects such a spam threat, it automatically generates an alert (block 132) that is communicated to one or more spam analysts 134 that may be monitoring the system 100.

In one embodiment, the spam analysts 134 may use the alert information to update the blacklist 138 to include the IP address. The updated blacklist 138 is preferably replicated across the network after a modification, such that each server 104 contains an updated instance of the blacklist 138. In this manner, the next time a connection or message arrives from that IP address, the server 104 will reject it.

In one embodiment, in addition to or instead of updating the blacklist 138, the spam analysts may update a spam database 136. The updated spam database 136 is preferably replicated across the network, such that each server 104 contains an instance of the database 136. The spam database 136 contains rules that are used to determine whether an e-mail message is spam. Each rule within the database is assigned a unique identification (ID) number and a "point score", which may represent a weight or point value given to the rule for determining whether a message that matches the rule is spam. Each message switch reviews the spam database 136 (e.g., an instance of the database) to determine whether e-mail messages are spam, as shown in FIG. 4.

Figure 4:
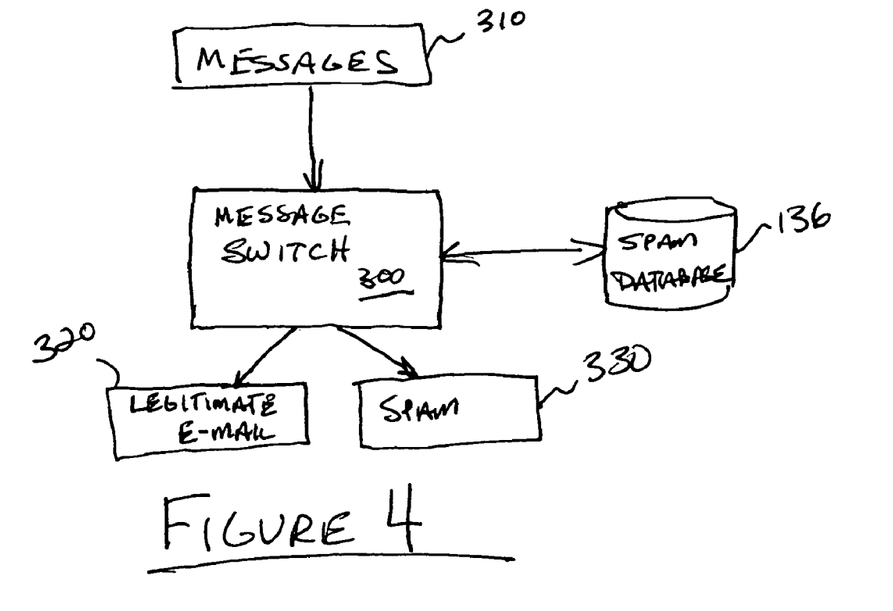
FIG. 4 is a block diagram illustrating the broad functionality of a message switch, which may be employed in the system shown in FIG. 1.

FIG. 4 illustrates the general operation of a message switch 300. The message switch 300 receives email messages 310. For each e-mail message, the message switch 300 compares portions of the message, such as the subject heading, from heading and body, to rules contained within the spam database 136. The message switch calculates a total spam score for each message. Particularly, when a message matches a rule, the point score associated with the rule is added or subtracted from the message's total spam score. A score threshold for each message may be defined in the message switch 300. When a message accumulates points greater than the threshold, the message switch 300 marks it as spam 330, and if it is below the threshold the message switch 300 treats it as legitimate mail 320. Therefore, the higher the point value associated with a rule, the more likely that a message matching the rule will be determined to be spam. The message switch 300 may transfer legitimate mail to the intended recipient or client 114, and mark other messages as spam and/or divert them to another location, such as a quarantine area. The rules may include, inter alia, rules regarding the originating IP address of e-mail messages, rules regarding the body of e-mail messages, and rules regarding the subject headings of e-mail messages. The database 136 may also include other rules and related attributes/statistics, such as those described in the '422 application.

When a spam analyst receives an alert from monitor 124 regarding a particular IP address, the analyst may create a rule corresponding to that originating or "from" address, and assign a score to the rule. If a rule already exists for the address, the analyst may adjust (e.g., increase) the score related to the rule. Alternatively, the spam analyst may direct the system to block or filter out all future e-mails originating from the IF address.

In another embodiment, rather than or in addition to generating an alert, the central monitor 124 may automatically create a rule relating to the IP address and store the rule within spam database 136; adjust or increase a score relating to a rule (if a rule for the IP address already exists); or generate a command to the add the IP address to the blacklist 138, thereby blocking all future e-mails originating from the IP address without the use of a spam analyst.

By utilizing packet sniffers 122 across the distributed network 102, the system is able to leverage data from various remotely located and unrelated customers to detect and stop spam messages. This allows the system to detect spam from an IP address even if a spammer has not repeatedly targeted a specific customer. For example, a number of unrelated customers may receive spam messages from the same IP address, but not enough spam individually to trigger a block against the IP address. However, the present invention will monitor the total spam message volume for the customers combined, and determine that it is sufficient to warrant blocking the IP address for the entire customer base.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

What is claimed is:

1. A hardware-implemented computer system for processing e-mail comprising:
a memory;
a plurality of servers that receive e-mail messages from a plurality of remotely located clients, the plurality of servers being part of a distributed network;
a plurality of packet sniffers, wherein each of the packet sniffers in the plurality of packet sniffers corresponds to and resides in a different server in the plurality of servers, wherein each packet sniffer in the plurality of packet sniffers is configured to; a) check a fragment offset field of an IP header to ensure the IP header is the first fragment of a packet, b) determine the value of a SYN bit in a TCP header, c) disregarding the packet if the SYN bit has not been set, and if the frame does not include an IP address, and if the IP address does not correspond to the server on which the packet sniffer is running, and if the IP address does not correspond to the configured port number and d) extract from the received packet originating IP addresses associated with e-mail messages that are communicated to the clients over the distributed network;

a central monitor that communicates over the distributed network with the plurality of packet sniffers and that monitors data regarding the originating IP addresses, wherein the central monitor is configured to determine whether traffic from an originating IP address has exceeded a threshold value, the central monitor being further configured to generate a response to detect spam e-mail messages if the threshold value has been exceeded; and a server in which the central monitor resides, wherein the server is distinct from each of the plurality of servers containing the plurality of packet sniffers in the plurality of packet sniffers in the distributed network.

2. The hardware-implemented system of claim 1 wherein each of the servers further includes a blacklist containing IP addresses that have been determined to be generating spam e-mail messages; and wherein each server checks the originating IP addresses of incoming connections to the addresses contained in the blacklist, and rejects any connection originating from an address on the blacklist.

3. The hardware-implemented system of claim 1 wherein each of the servers further includes a message switch that determines whether e-mail messages are spam, and communicates e-mail messages to clients.

4. The hardware-implemented system of claim 3 further comprising:

a spam database for storing rules for determining whether e-mail messages are spam;

wherein the message switch determines whether e-mail messages are spam based on the rules within the spam database.

5. The hardware-implemented system of claim 4 wherein each rule in the database is assigned a score that is used to determine whether an e-mail message is spam.

6. The hardware-implemented system of claim 5 wherein the response generated by the central monitor comprises raising the score of a rule corresponding to the originating IP address.

7. The hardware-implemented system of claim 1 wherein the response generated by the central monitor comprises an alert that is communicated to a spam analyst.

8. The hardware-implemented system of claim 2 wherein the response generated by the central monitor comprises a command to add the originating IP address to the blacklist.

9. The hardware-implemented system of claim 1 wherein the threshold value comprises a rate parameter.

10. The hardware-implemented system of claim 1 wherein the threshold value comprises a maximum total connections parameter.

11. The hardware-implemented system of claim 1 wherein the central monitor determines whether an originating IP address has exceeded a threshold value by use of a token bucket algorithm including a rate parameter and a maximum connections allowed parameter.

12. A hardware-implemented system for detecting spam e-mail messages in a distributed network including a plurality of servers that receive and process e-mail messages for a plurality of different remotely located clients, the system comprising:

a memory;

a plurality of packet sniffers, each of which is located on a unique one of the plurality of servers, such that each of a plurality of packet sniffers are configured to; a) check a fragment offset field of an IP header to ensure the IP header is the first fragment of a packet, b) determine the value of a SYN bit in a TCP header, c) disregarding the packet if the SYN bit has not been set, and if the frame does not include an IP address, and if the IP address does not correspond to the server on which the packet sniffer is running, and if the IP address does not correspond to the configured port number and d) extract originating IP addresses associated with e-mail messages that are communicated to clients by the server;

a central monitor that communicates with the plurality of packet sniffers and that monitors data regarding the originating IP addresses, wherein the central monitor is configured to determine whether traffic from an originating IP address has exceeded a threshold value, the central monitor being further configured to generate a response to detect spam e-mail messages if the threshold value has been exceeded; and a server in which the central monitor resides, wherein the server is distinct from each of the packet sniffers in the plurality of packet sniffers in the distributed network.

13. The hardware-implemented system of claim 12 wherein the central monitor resides on a server separate from the packet sniffers.

14. The hardware-implemented system of claim 12 further comprising:

a blacklist stored on each of the servers, the blacklist including IP addresses that have been determined to be generating spam.

15. The hardware-implemented system of claim 12 further comprising:

a spam database that stores rules for determining whether e-mail messages are spam; and a message switch that determines whether e-mail messages are spam based on the rules within the spam database.

16. The hardware-implemented system of claim 15 wherein each rule in the database is assigned a score that is used to determine whether an e-mail message is spam.

17. The hardware-implemented system of claim 16 wherein the response generated by the central monitor comprises raising the score of a rule corresponding to the originating IP address.

18. The hardware-implemented system of claim 12 wherein the response generated by the central monitor comprises an alert that is communicated to a spam analyst.

19. The hardware-implemented system of claim 12 wherein the response generated by the central monitor comprises a command to the system to block future e-mail messages from the originating IP address.

20. The hardware-implemented system of claim 12 wherein the threshold value comprises a rate parameter.

21. The hardware-implemented system of claim 12 wherein the threshold value comprises a maximum total connections parameter.

22. The hardware-implemented system of claim 12 wherein the central monitor determines whether traffic from an originating IP address has exceeded a threshold value by use of a token bucket algorithm including a rate parameter and a maximum connections allowed parameter.

23. A method for processing e-mail and detecting spam e-mail messages, comprising:

routing the e-mail messages of a computer through a distributed network including a plurality of servers that receive and process e-mail messages for a plurality of different remotely located clients;

communicating the processed messages to the plurality of remotely located clients by use of the plurality of servers;

a) checking a fragment offset field of an IP header to ensure the IP header is the first fragment of a packet, b) determining the value of a SYN bit in a TCP header, c) disregarding the packet if the SYN bit has not been set, and if the frame does not include an IP address, and if the IP address does not correspond to the server on which the packet sniffer is running, and if the IP address does not correspond to the configured port number and d) extracting, at the plurality of servers, originating IP addresses associated with e-mail messages that are communicated to the plurality of remotely located clients;

monitoring data regarding originating IP addresses;

determining whether traffic from an originating IP address has exceeded a threshold value; and generating, at a central monitor, a response for use in detecting spam e-mail messages if the threshold value has been exceeded.

24. The method of claim 23 further comprising:
storing data regarding the originating IP addresses in a database.

25. The method of claim 23 further comprising:
maintaining a list of acceptable IP addresses;
checking originating IP addresses against the list; and
determining whether traffic from an originating IP address has exceeded a threshold value only if the originating IP address is not in the list.

26. The method of claim 23 wherein the threshold value comprises a rate parameter.

27. The method of claim 23 wherein the threshold value comprises a maximum total connections parameter.

28. The method of claim 23 wherein determining whether traffic from an originating IP address has exceeded a threshold value is performed by use of a token bucket algorithm including a rate parameter and a maximum connections allowed parameter.

29. The method of claim 23 further comprising:
storing IP addresses that have been determined to be generating spam in a blacklist;
checking originating IP addresses of incoming connections to the servers against the IP addresses contained in the blacklist; and
rejecting any connection originating from an IP address in the blacklist.

30. The method of claim 29 wherein the response generated by the central monitor comprises a command to add the originating IP address to the blacklist.

31. The method of claim 23 further comprising:
storing rules for determining whether e-mail messages are spam in a spam database; and
determining whether e-mail messages are spam based on the rules within the spam database.

32. The method of claim 31 wherein each rule in the database is assigned a score that is used to determine whether an e-mail message is spam.

33. The method of claim 32 wherein generating a response comprises raising the score of a rule corresponding to the originating IP address.

34. The method of claim 23 wherein generating a response comprises communicating an alert to a spam analyst.

35. The method of claim 23 wherein the response generated by the central monitor comprises a command to the system to block future e-mail messages from the originating IP address.

* * * * *